United States Patent Office 2,783,784
Patented Mar. 5, 1957

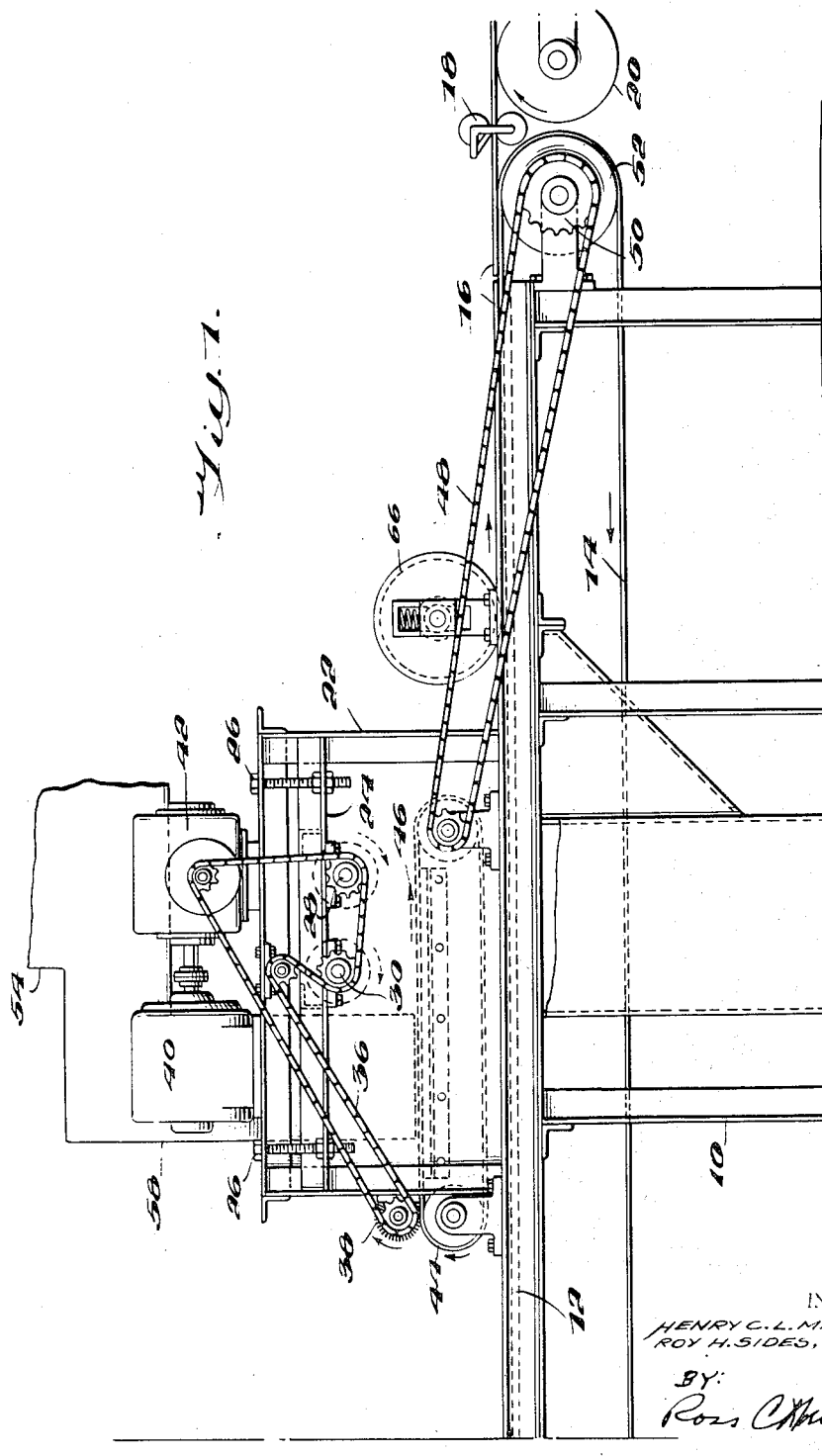

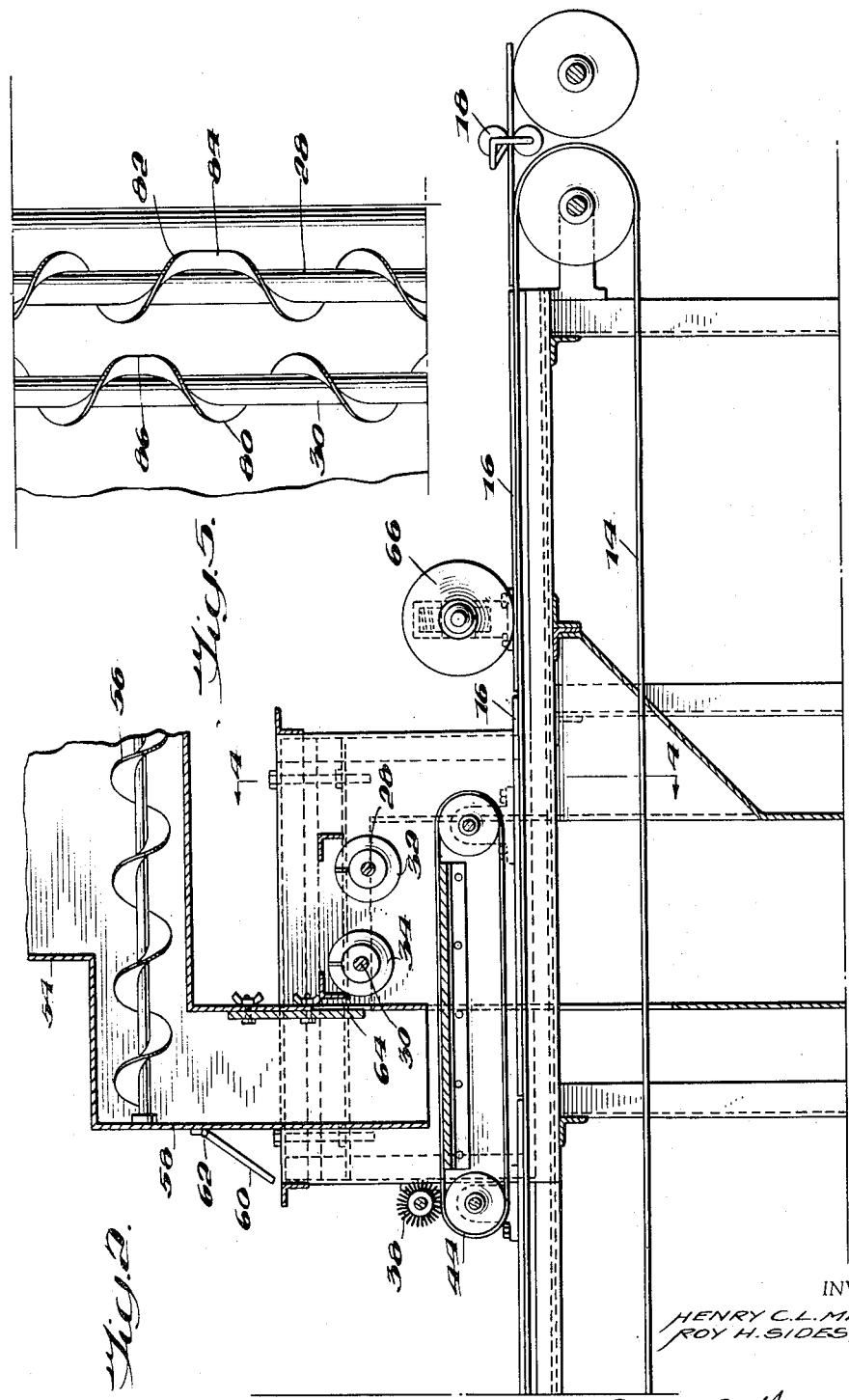

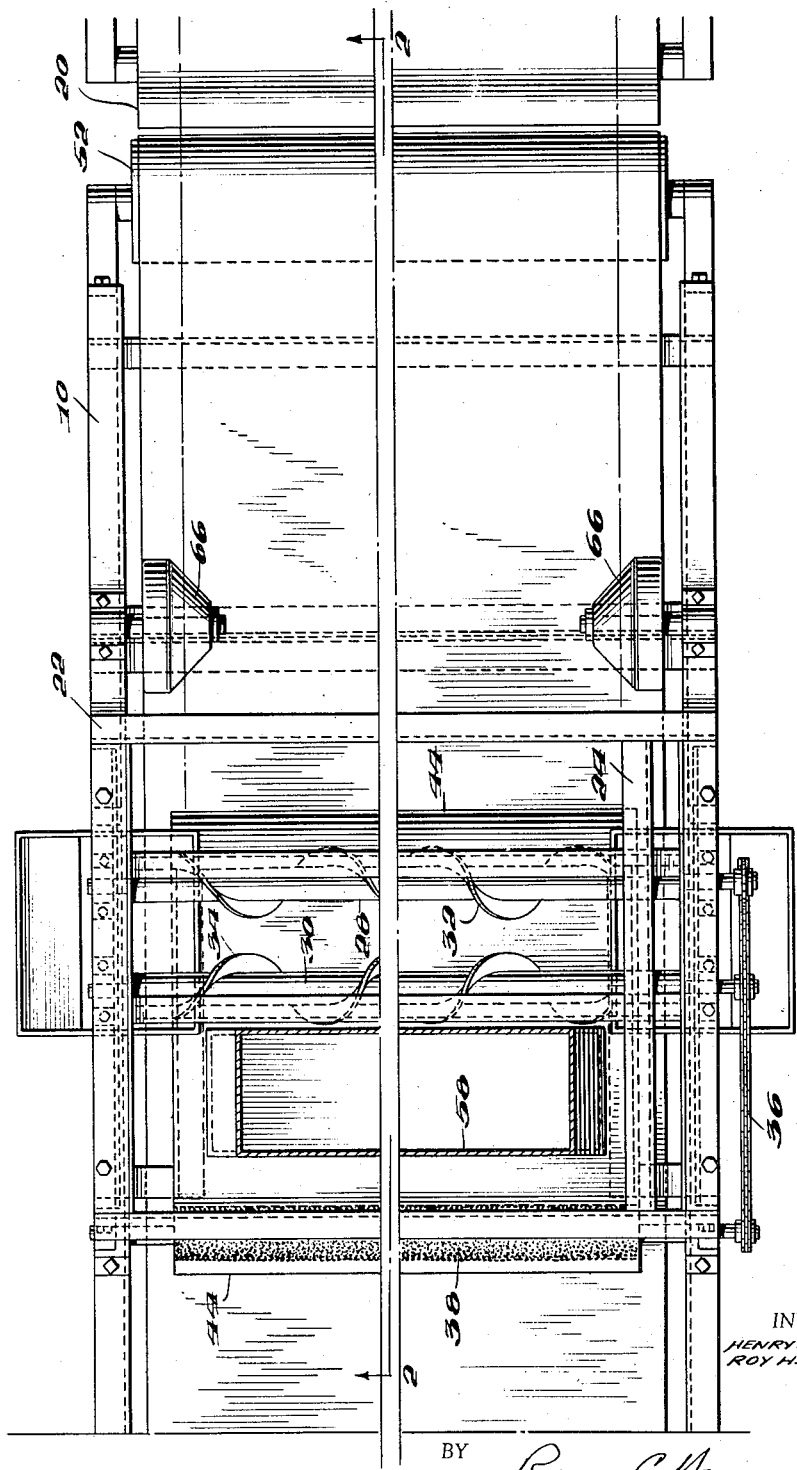

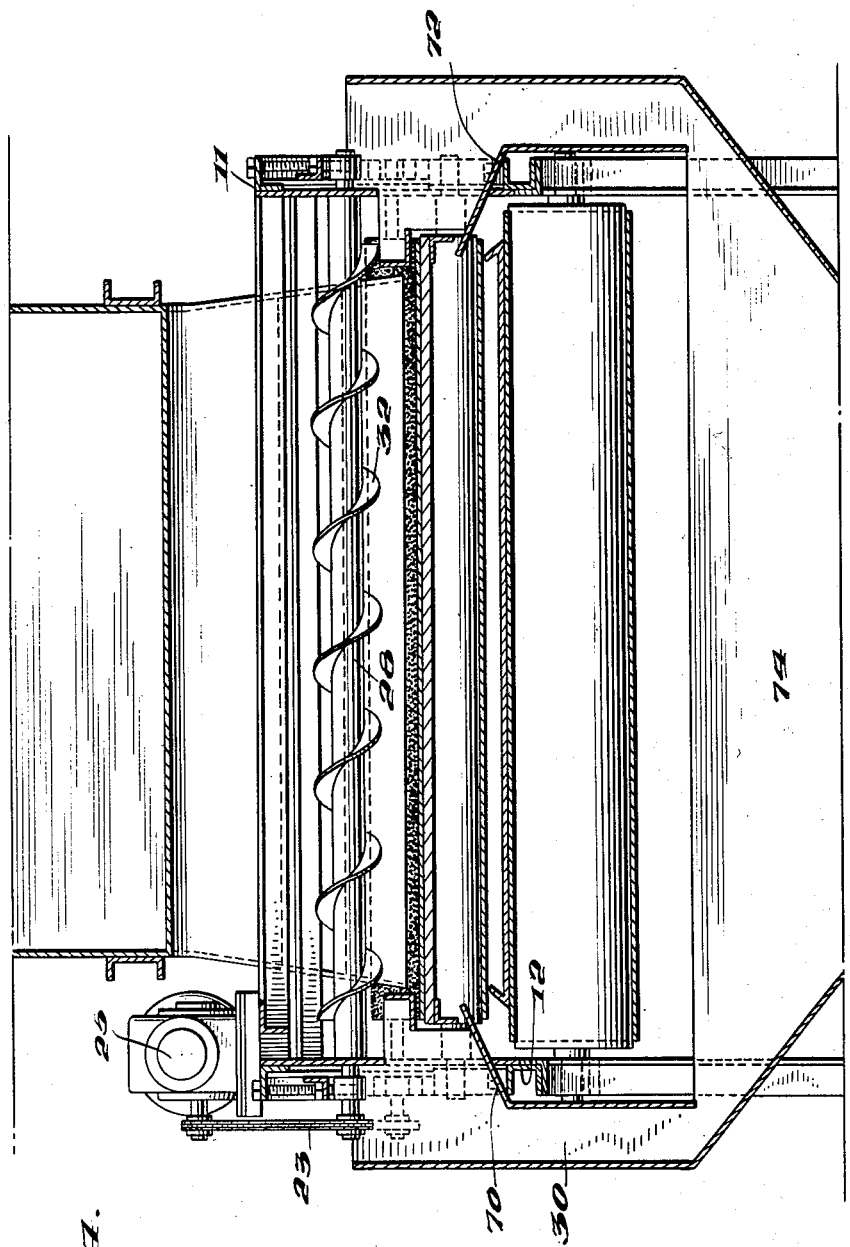

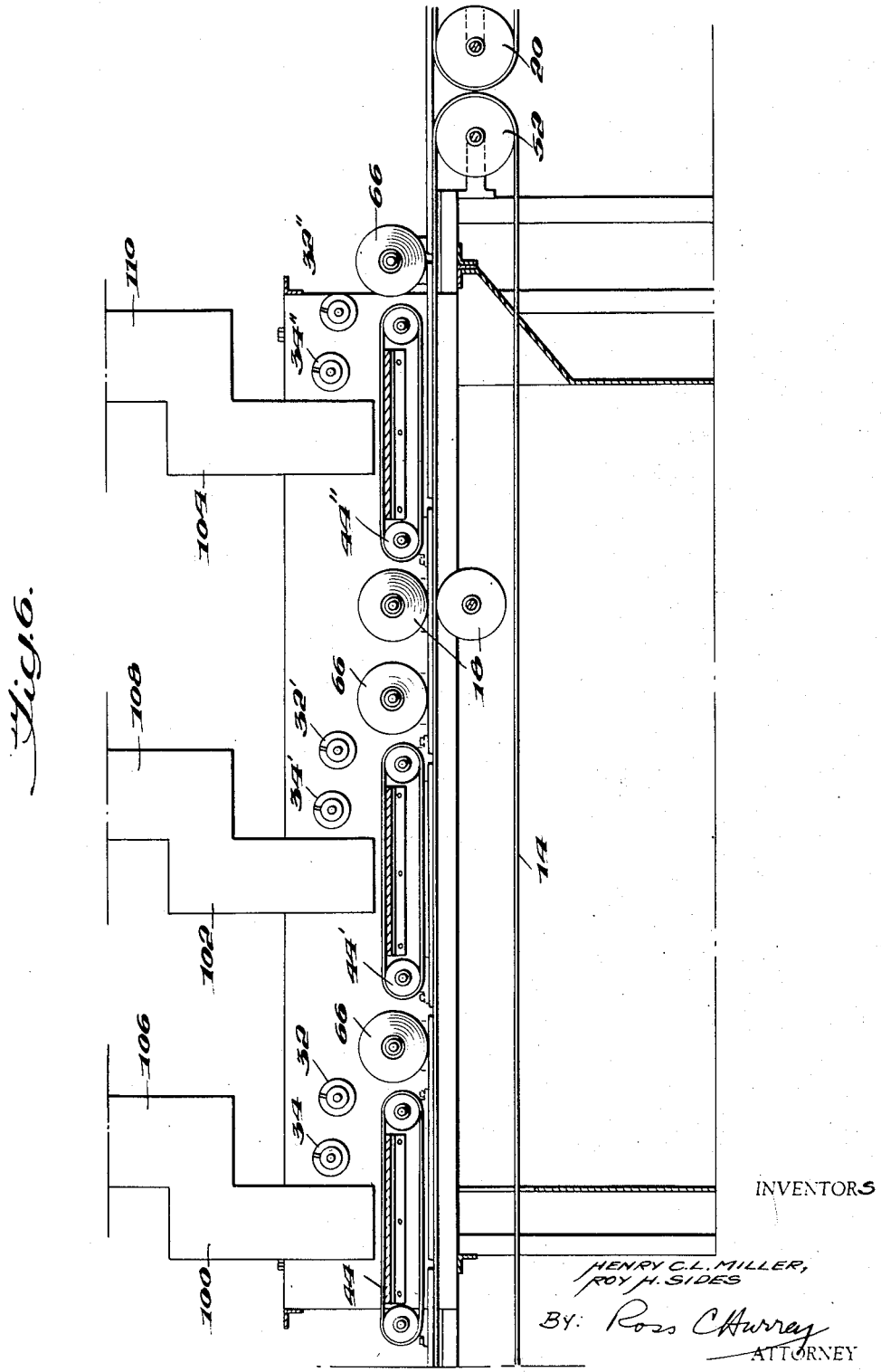

2,783,784

METHOD AND MEANS FOR MAKING COMPOSITION BOARD

Henry C. L. Miller and Roy H. Sides, Richmond, Va., assignors to Miller Hofft, Inc., Richmond, Va., a corporation of Delaware Application July 17, 1953, Serial No. 368,603

2 Claims. (Cl. 141—1)

It is the general object of this invention to provide a novel method and means of forming composition board from what would otherwise be waste material.

In our prior copending application Serial No. 249,984, filed October 5, 1951, now Patent No. 2,740,990, whereof this application is a continuation-in-part, we describe and claim such a composition board, and method and apparatus for making the same. The present invention relates to a method and apparatus which may be incorporated as a part of the method and apparatus therein disclosed.

In said Serial No. 249,984 it is described how woodworking or mill waste, particularly wood chips, may be formed into composition board by the following steps:

(A) By shredding or hogging large waste pieces, cycloning andscreening them to obtain uniform particles of fairly large sizes, with fines removed;

(B) By drying the chips if green or wet wood;

(C) By mixing the dried chips with a thermosetting resin and a pulverulent filler;

(D) By feeding the mixture so formed from a chip storage tank onto a vibrating feeder or chute to secure a uniform layer or matte, the layer being delivered onto trays carried by a belt conveyor;

(E) By passing the trays under sizing or compacting rolls and thence to a speed-up conveyor; and (F) By removing the trays and curing the matte in a hot plate press.

The present invention is involved with step (D) above described, and consists of a method and means for delivering onto the trays a layer of chips of predetermined caliper and quality. We have found that by feeding a mixture of chips and binder upon a moving belt, the surface of which is maintained flat, and by supplying a substantial excess of chips, it is possible laterally to remove the excess and to form a traveling matte of rigorously maintained uniform caliper and density.

Since the ultimate delivery is into trays which in course of time may become deformed it is clear that the caliper of the matte is quite independent of any deformation of the trays whereas if the matte were formed directly into the trays using these as a basis for the control of caliper, variations in density of the final product inevitably would be encountered. The caliper of the ultimate finished board of course is determined by the final hot pressing step. Variations in the caliper of the matte do not affect this unless extreme on the deficiency side. On finished product, however, variations in matte caliper do distinctly affect the density of the final product.

Accordingly the method of the invention comprises forming a layer of mixed chips and binder in excess of the amount desired for the finished board, moving the layer on a level support, and at the same time scraping laterally from the surface thereof, the excess. The means for removing the excess preferably include one or more helicoid screws. According to one embodiment of the invention, a pair of such screws are provided to scrape off the excess chips, the scraping action of the respective screws being in opposite directions. In a modified form of the invention, one or more screws may be utilized, each screw having helicoids of opposite hand on either end designed to scrape laterally away from the center of the mass passing beneath.

In Figure 1 of Serial No. 249,984 a vibrating feeder 58 is shown and described as a means for delivering a uniform layer of mix onto the conveyor. The present invention provides an improved method and means for performing this function.

In the drawing:

Figure 1 is a side elevation of one form of the invention;

Figure 2 is a vertical section on lines 2—2 of Figure 3;

Figure 3 is a top plan view with parts in sections;

Figure 4 is an elevation with parts in section on lines 4—4 of Figure 2;

Figure 5 is a detail top plan view showing a modified form of the screw means used to level the matte; and Figure 6 is a view similar to Figure 2 but showing a specialized form of the invention.

Referring now to Figure 1 a main frame 10 supports a table 12 (Figure 4) over which runs a conveyor belt 14. A series of trays 16 are fed onto this belt and receive chips. From the belt 14 the trays 16 pass between sizing or compressing rolls 18, thence to a second conveyor 20. All of these parts are as disclosed in our copending application aforesaid. An auxiliary frame 22 is mounted on the frame 10 and adjustably supports a transverse frame 24 by means of adjustable bolts 26. Journaled in the transverse frame 24 are shafts 28 and 30. Mounted on the shaft 28 is a screw conveyor blade 32 while a similar screw conveyor blade 34 is mounted on the shaft 30. As best seen in Figure 3 the helical blades 32 and 34 are of opposite hand. The shafts 28 and 30 are driven in the same direction by a chain 36 which also operates a brush 38. The chain 36 is driven by a motor 40 through a speed reducer 42.

A matte-forming conveyor 44 is mounted on the frame 10 and underlies the shafts 28 and 30. This conveyor is driven in the direction of the arrow 46 by a chain 48 from a sprocket 50 on the end pulley 52 of the conveyor 14.

Referring now to Figure 2 a hopper 54 supplies a mixture of chips and binder to a series of parallel screw conveyors 56 which deliver the mixture to a spout 58. A gate 60 hinged at 62 to the spout 58 gives access to the interior of the spout. A vertically adjustable gate 64 regulates the thickness of the bed of chips deposited on the belt 44. This quantity is adjusted to a very substantial excess (1.2 to 2) of what is ultimately desired.

It is next to impossible, for any substantial width of matte, to feed uniformly a mixture of chips and binder directly from a hopper onto a traveling web. Localized arching or caking may take place with resultant lack of uniformity in the density of the matte. By delivering chips from the hopper 54 to a number of closely proximate, parallel screws 56 the possibility of localized compaction is eliminated. Each screw acts as an agitator and uniformity of density is assured. To be sure, the screws 56 in and of themselves would not deliver a matte of uniform thickness but rather tend to produce parallel mounds, each mound extending parallel to the screw which created it. The density of the delivered chips, however, is exceptionally uniform, for which reason the use of parallel screws 56 intermediate the hopper 54 and the spout 58 must be considered as a definite contribution to this invention.

A portion of this excess is immediately transferred laterally by the blade 34 and the remaining excess is transported laterally by the blade 32 which adjusts the final thickness of the matte. This matte then drops off the front end of the conveyor 44 into the trays 16 on the conveyor 14. Obviously conveyors 14 and 44 operate at the same lineal speed.

It is quite impossible to control any quantity unless there is a decided excess available of the controlled quantity over the quantity required for the controlled delivery. For example, if there is available 100 p. s. i. of steam pressure, a delivery of 50 p. s. i. can be maintained with great accuracy. But if their is available 51 p. s. i. it is next to impossible to assure uniform delivery of 50 p. s. i. This point is made in order to differentiate the present invention from a mere leveling or troweling process. If for applicants' blade 32 and 34 there were substituted simple doctors, any substantial excess quickly would become unmanageable. It therefore would be necessary to feed the supply of chips at a rate so close to the required delivery rate as to risk occasional deficiencies and these no doctor blade possibly could correct. The positive lateral removal of excess by the blades 32 and 34 makes it certain that there never can be either excessive thickness or any possible deficiency.

The loaded trays pass between a pair of tapered press rolls 66 which shape and compact the edges of the mattes.

When it is desired to alter the thickness of the web, the gate 64 in the spout 58 is appropriately adjusted. Then by means of the adjustable bolt 26 (see Fig. 1) an equivalent vertical adjustment is made in the level of the blades 32 and 34. Any suitable tensioning device engaging a reasonable amount of slack in the chain 36 will permit this adjustment to be made.

Excess chips removed by the blades 32 and 34 drop into hoppers 70 and 72, best shown in Fig. 4 where they drop into a bin 74. By conventional means, chips arriving in bin 74 are returned to the hopper 54 which returns them to the process. Accordingly, no chips are lost due to the supply of an excess to the conveyor 44.

Referring now to Figure 5 there is shown a modification on which shafts 28 and 30 carry "double action" blades 80 and 82. By the term "double action" blades we mean a pair of helical blades of opposite hand meeting at the approximate median point of the shaft. In the case of shaft 28 the median point is indicated at 84 while in the case of shaft 30 the median point is indicated as 86. It will be noted that transverse the matte these central points are mutually offset. This arrangement has proved it is superior to that previously discussed in connection with certain sizes and kinds of chips, and has the advantage of moving the excess chips a minimum lateral distance. It would be unfair to claim that either the arrangement of Figure 3 or that of Figure 5 is optimum for every possible combination of chip size, matte thickness and binder. However, one or the other of these forms will do an optimum job on any combination apt to be encountered.

Occasionally it will be desired to produce a composite board having, say, two mutually different surfaces and a core between the surfaces different from either. As a concept this is capable of considerable variation in the way of "permutations and combinations." Basically, however, the idea is disclosed in Figure 6 in which the conveyor 16 runs below consecutive conveyors 44, 44' and 44" each of which runs under a spout 100, 102 and 104, which are respectively supplied by hoppers 106, 108 and 110. Each of the spouts is identical to the spout 58 shown in Figure 2. The spout 100 deposits an initial layer of chips on the conveyor 44. These may be, for example, exceptionally fine. An excessive layer is delivered and the excess is removed by a pair of helical blades 34 and 32. Spout 102 then delivers a second layer of different size chips, the excess being removed by a similar pair of blades 34' and 32'. Spout 104 then delivers a final layer of still different chips, the excess being removed by blades 34" and 32". The successive layers are deposited on the trays on the conveyor 14 to build up a composite matte. Usually the first and third layers will be quite thin and the second layer quite thick. In this case the compaction 18 rolls are moved from their position (as shown in Figure 1) to lie between conveyor 44' and conveyor 44". By compacting the relatively thick layer deposited by the conveyor 44', the chance of the layer deposited by the conveyor 44" sifting through the matte is minimized.

From the foregoing it is clear that we have provided a method and means for delivering under all circumstances a continuous layer of chips of a positive predetermined caliper in which we have avoided not only any possibility of excessive caliper, but also any possibility of insufficient caliper. This uniformity of caliper, moreover, not only exists longitudinally of the matte in its direction of advance but also transverse the matte. Moreover, due to the reversely acting screws any possibility of undersirable orientation of the chips is avoided.

We claim:

1. In a process for forming boards from wood chips, the steps of continuously forming parallel mounds of chips in aggregate amount substantially in excess of the ultimate desired amount, advancing said mounds in the direction of their length, during said advance continuously and positively exerting force on the crests of said mounds, said force being directed transverse the direction of advance of said mounds to form a homogeneous matte of desired caliper, advancing a series of trays below said matte and depositing said matte into said trays.

2. In apparatus for forming boards from wood chips: a hopper, a series of parallel screws at the base of said hopper, a chute receiving parallel streams of chips from said screws, a conveyer below said chute receiving said chips in parallel mounds, means mounted above said conveyer for leveling the chips in said mounds to a homogeneous matte of desired caliper; and a second conveyer below said first conveyer extending beyond said first conveyer and receiving said matte from said first conveyer.

References Cited in the file of this patent
UNITED STATES PATENTS

| | | |
|---|---|---|
| 1,140,702 | Norton | May 25, 1915 |
| 1,367,227 | Baumgartl | Feb. 1, 1921 |
| 1,702,730 | Hite | Feb. 19, 1929 |
| 1,781,728 | MacIldowie | Nov. 18, 1930 |
| 2,619,681 | Baker et al. | Dec. 2, 1952 |
| 2,623,676 | Baker et al. | Dec. 30, 1952 |